3,087,879
CONTROL ROD
David E. Walker, Park Forest, and Steve Matras, Chicago, Ill., assignors to the United States of America as represented by the United States Atomic Energy Commission
Filed Feb. 6, 1961, Ser. No. 87,513
7 Claims. (Cl. 204—154.2)

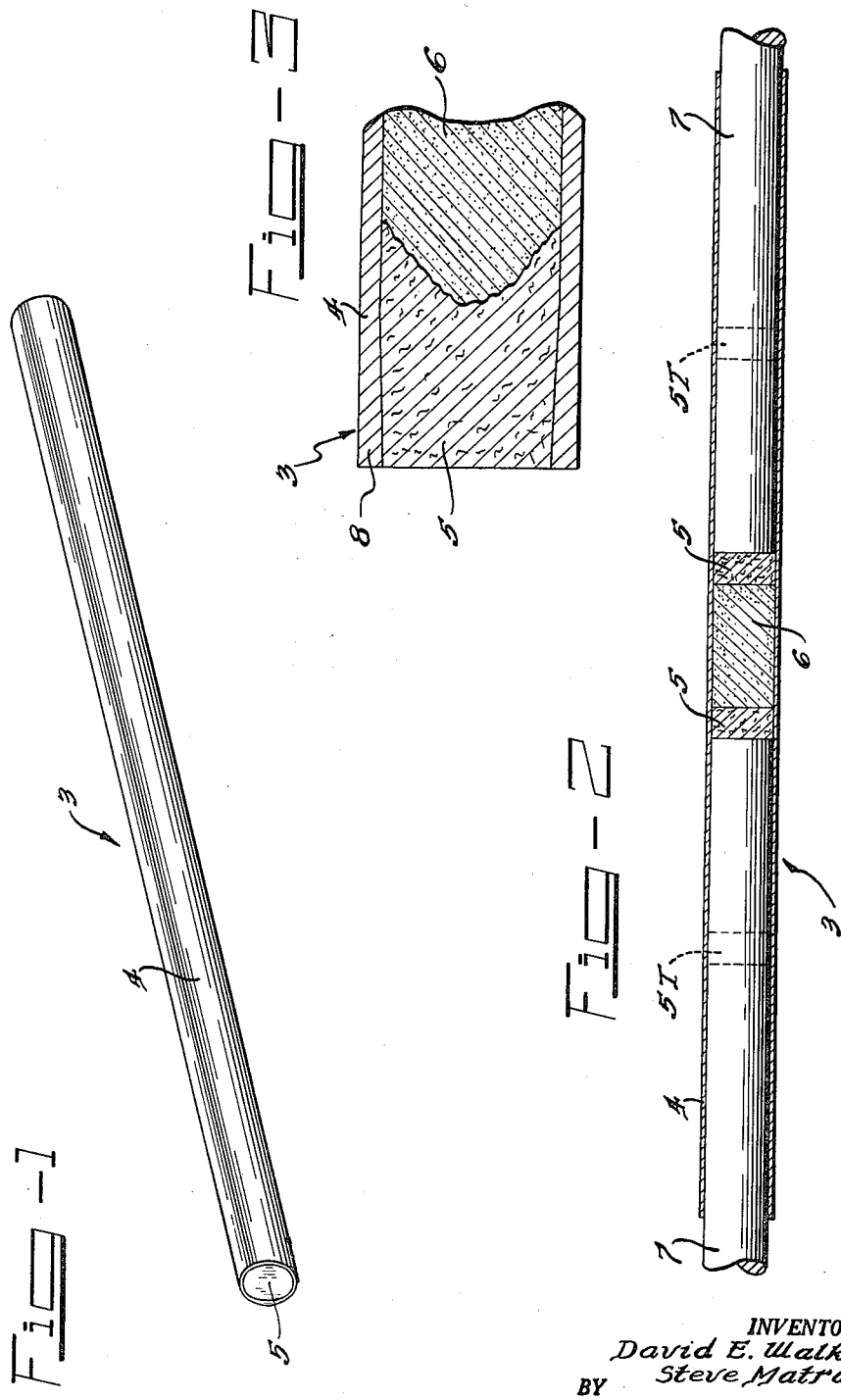

The invention relates to a novel rod for nuclear reactors and to a method of making the same, more particularly to a control rod containing boron.

Control rods and fuel rods in nuclear reactors are subject to failure due to the buildup of gas pressure within the rods from transmutation or fission product gases. Boron, for example, is in many respects an ideal control rod material or neutron absorber, but it emits alpha particles upon neutron absorption which results in a buildup of helium pressure. Up until the present, many methods have been used to confine pressures of this kind safely within the control or fuel rods, but despite all these efforts rods are ruptured by internal gas pressures so that reactor operation is interfered with, often quite seriously.

It is, accordingly, the object of the invention to provide a rod for nuclear reactor use which will not be subject to rupture by internal gas pressure.

It is a more particular object to provide a boron control rod which will not be subject to rupture by internal gas pressure.

It is a further object to provide a method for making rods of the kinds above mentioned.

All the foregoing objects are attained by our discovery that control and fuel rods may be made with porous ends of compacted metal wool, which will permits the escape of gas, while excluding liquids from the interior of the rods.

FIGURE 1 is a perspective drawing of the rod of the invention.

FIGURE 2 is a schematic sectional view of the method of sealing the rod of FIGURE 1.

FIGURE 3 is a sectional view of one end of a completed rod.

Referring to FIGURE 1, a boron control rod is shown generally at 3. It consists of a hollow cylindrical metal portion 4 and porous plugs 5 at each end, one of which can be seen in the perspective view. Elemental boron inside the hollow cylindrical portion between the plugs cannot be seen, of course, in the perspective view.

As shown in FIGURE 2, control rod 3 is fabricated by placing a quantity of elemental boron powder 6 within cylindrical portion 4 in a loosely packed condition. Compacts or plugs 5 of metal wool, with a density of about 30 to 50 percent of the theoretical, or as compared to the density of a solid mass of the metal from which they are made, are inserted into the cylindrical portion 4 in temporary positions shown at 5T in dashed outline. The assembly is then placed in a ram press between press rods 7, which then push inward so as to bring the plugs 5 into their final inner positions, thus compacting the granular boron 6.

The assembly is then removed from the ram press and reduced in outer diameter by any of the methods known to the art such as cold drawing, hot drawing, or cold swaging. Of these, cold swaging is to be preferred. Reduction of outer diameter by any of these methods results in a shrinkage of the inner diameter and a rather large increase in over-all tube length. Together these effects increase the compaction of the porous metal wool plugs. The plugs, when compacted in this way, have a resulting density of about 95% of the theoretical. Another benefit from this method of fabrication is that the reduction of wall thickness is less in the vicinity of the metal wool plugs at the ends than in the center of the rod. This results in a wall thickening at the ends as shown at 8 in FIGURE 3, which holds the plug 5 in place.

The rods, following the swaging or other similar operation, are annealed at a temperature and for a sufficient time to remove the strains of the cold working, but without softening the metal wool so as to affect the porosity of the plugs.

Rods made according to our invention have been found to be pervious to helium, while impervious to liquid sodium. They may therefore be used as control rods, fuel rods containing fissionable fuel such as uranium and plutonium or blanket rods in reactors of the breeder type containing fertile material such as uranium-238 and thorium-232.

*Example*

29.30 grams of elemental boron were placed in the middle of a type 304 stainless steel tube 4 with an inner diameter of one inch and an outer diameter of 1⅛ inches, and a length of 18 inches. Into each end was inserted a type 304 stainless steel wool compact 5 weighing 3.52 grams and having a density of 44.3% of the theoretical. Type 304 stainless steel is an alloy consisting essentially of 0.08 w/o (weight percent) C. 18.0 to 20.0 w/o Cr, 8.00 to 11.00 w/o Ni, 2.00 w/o Mn, and the balance Fe.

The compacts, or porous plugs 5, were pressed by hand to positions four inches from the ends of the tube and steel press rods 7 were inserted into both ends in contact with the plugs. Press rods 7 fit snugly but were not airtight. The assembly was then positioned in a ram press having two pistons which simultaneously pressed the press rods 7 and, in turn, the porous plugs 5 toward the center of the tube until the inner faces of the porous plugs came within 1¹⁵⁄₁₆ inches of each other, as shown by a radiograph.

The assembly was then passed through a cold swaging machine and the tube was reduced 83.3% in cross-sectional area in nine passes. Radiographs taken at the end of these showed the inner diameter to be 0.411 inch and the wall thickness 0.061 inch. The distance between the inner faces of the porous plugs, or "core length," was 7 inches, as compared to the 1¹⁵⁄₁₆ inches before the swaging, as above mentioned. The outer diameter was 0.533 inch. It is to be understood that these inner diameter and wall thickness dimensions applied to the rod over most of its length, but that at the ends the wall thickening resulted in the negative taper shown in FIGURE 3.

The rod 3 was heat treated at 900° C. for 17 hours in air, followed by a quick air quench. The rod 3 was then cut off at the outer faces of the porous plugs 5 and polished on all its surfaces by machining in a centerless grinder. The length of the finished rod as eight inches.

It will be understood that this invention is not to be

What is claimed is:

1. A control rod for use in a nuclear reactor comprising a hollow cylindrical tube, a neutron absorber within the cylindrical tube, and gas-pervious, liquid-impervious plugs of compacted metal wool at both ends of said tube, said tube having negative tapers adjacent both ends.

2. The control rod of claim 1 where the plugs have a density of about 95 percent of the theoretical.

3. A fuel rod for a nuclear reactor comprising a hollow cylindrical tube, a fissionable fuel within the cylindrical tube, and gas-pervious, liquid-impervious plugs of compacted metal wool at both ends, said tube having negative tapers adjacent both ends.

4. A method of making a rod for a nuclear reactor comprising inserting nuclear material into a cylindrical tube, inserting porous plugs of metal wool at each end of the tube, compacting the plugs and material from both ends, and then reducing the outer diameter of the cylindrical tube.

5. The method of claim 4 where the nuclear material is a neutron absorber.

6. The method of claim 4 where the nuclear material is fissionable fuel.

7. The method of claim 4 where the reducing of the outer diameter is by cold swaging.

References Cited in the file of this patent

UNITED STATES PATENTS

| | | |
|---|---|---|
| 2,863,817 | Morris | Dec. 9, 1958 |
| 2,873,853 | Burton | Feb. 17, 1959 |
| 2,993,786 | Robaff et al. | July 25, 1961 |

OTHER REFERENCES

"Nuclear Metallurgy," vol. 5, "Ceramic Base Elements; Metal Base Fuels and Jacket Components," published by the Metallurgical Society, 1958, pp. 1–12. Copy in Div. 46.